June 28, 1932. R. B. RESPESS 1,864,939
NONSKID TIRE
Filed Jan. 16, 1929
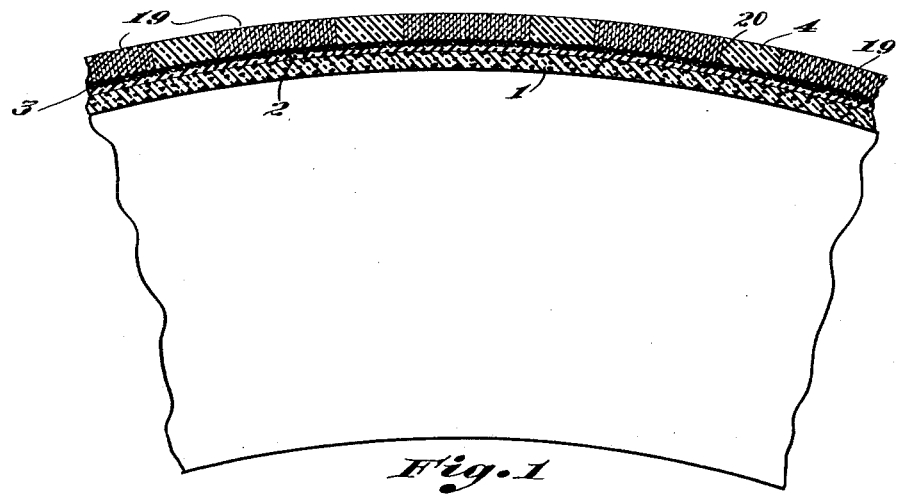
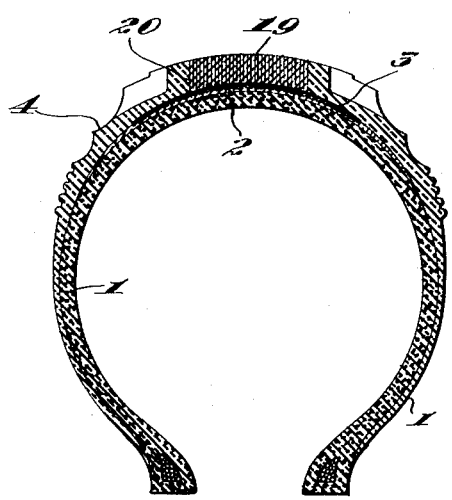
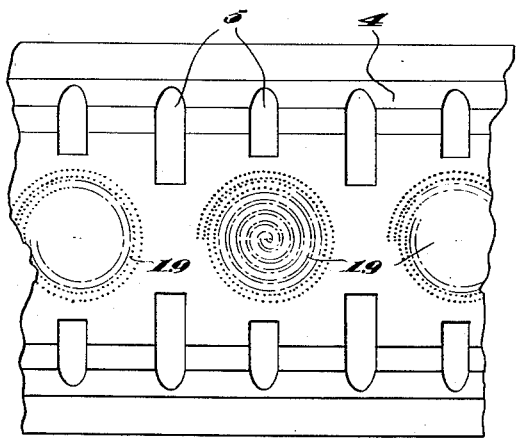
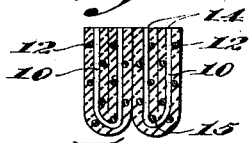
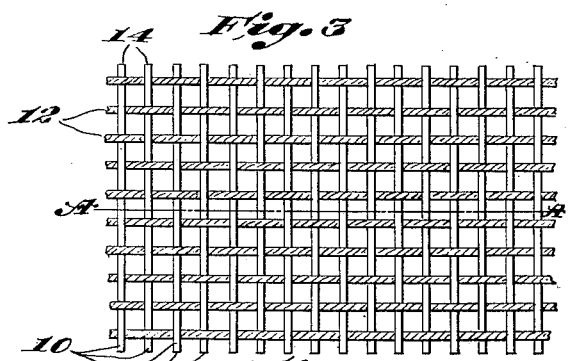
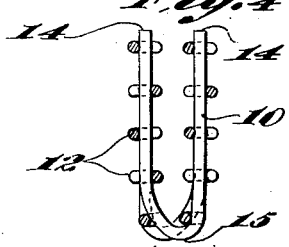

Patented June 28, 1932

1,864,939

UNITED STATES PATENT OFFICE

ROLAND B. RESPESS, OF WICKFORD, RHODE ISLAND, ASSIGNOR, BY MESNE ASSIGNMENTS, TO RESPATS INC., OF CRANSTON, RHODE ISLAND, A CORPORATION OF RHODE ISLAND

NONSKID TIRE

Application filed January 16, 1929. Serial No. 332,786.

This invention relates to non-skid tires for vehicles and particularly to tires having metal elements embedded in their tread portions to enhance their non-skid qualities.

Heretofore non-skid tires have ordinarily been provided with corrugated rubber treads or the like which, when new, have been fairly effective under favorable conditions in preventing skidding or slipping.

Under particularly adverse conditions, however, for example when the roadway is covered with a thin slimy lubricating film, the corrugated tread is practically ineffective. Consequently non-skid chains are ordinarily used when tractive conditions are especially unsatisfactory, but the motoring public is generally very reluctant to use non-skid chains and depends upon the tire tread in so far as possible to afford satisfactory traction, with consequent risk of accidents.

The present invention is designed to overcome these objectionable characteristics of the ordinary non-skid tires, and to permit the extended use of the tire without chains or similar applied devices and to provide a tire which may retain its non-skid characteristics during the life of the tread, thus differing from the ordinary corrugated surface tread which soon wears away and becomes practically smooth long before the useful life of the tire is terminated. To this end the present invention provides numerous metal elements embedded in the tread itself and arranged to retain their position in the same until the tread is substantially worn down to the carcass or breaker strip itself.

While there have been numerous previous attempts to provide non-skid tires of this general character with metal elements embedded in the tread portion thereof, such attempts have generally proven unsatisfactory in practice for one or more reasons. In certain of these arrangements the metallic elements have been embedded directly in the rather soft rubber of the tread itself, which accordingly has not offered satisfactory support for the metal elements which tended to have an objectionable movement in the soft rubber and to break away from the same. Non-skid arrangements of this same general type have also been objectionable due to the arrangement of the metallic elements in such a manner that they cut, chafe, or objectionably wear adjoining parts of the tire so that the latter has a comparatively short life, or because the metal elements are effective only when the tire is first in use and will not retain their original effectiveness during the wearing life of the tread, or because they do not permit normal flexing of the tire tread in response to road irregularities. Furthermore, these non-skid arrangements have generally been costly and impractical to manufacture.

The present invention affords a non-skid tread having numerous metallic non-slip elements supported therein in such a manner that objectionable heat due to the inter-engagement between metal portions is avoided, and also in such a manner that cutting or undue chafing of any local portion of the tire and consequent breakdown of the same is also avoided. Furthermore, the numerous penetrative points are firmly held in spaced relation to each other so that objectionable lateral movement or deflection from normal position is avoided. For this purpose, I preferably provide a rubberized fabric having wires woven into the same with myriad end portions arranged to define the non-skid surface. Adjoining the opposite non-tractive surface of these elements that are embedded in the tire tread, the wire fabric is preferably formed into folds which result in each wire portion being bent into a U-shape without sharp corners, ends or projections which might engage the adjoining portion of the tire and injured the same. The wires are preferably so woven with the textile strands that they are insulated from each other and consequent metal to metal friction with the resultant heat and attendant deleterious effect is avoided while the wire ends are firmly held in place substantially perpendicular to the non-skid surface during the effective life of the tire. Preferably non-skid elements made up of lamentations or convolutions of a U-shape strip formed in this manner are embedded in and vulcanized in places in the tire itself.

Thus the present invention provides a tire tread which affords a tenacious tractive grip and is adapted to cut through any slimy film or to engage the most slippery of surfaces with numerous penetrative points which provide an interlocking effect which prevents slipping in any direction.

My copending application Serial No. 265,986, filed March 30, 1928, discloses apparatus for manufacturing non-skid elements of the general character disclosed herein and describes the method which may be employed to manufacture these elements.

In the accompanying drawing:

Fig. 1 is a central vertical section through a portion of a tire constructed in accordance with the present invention;

Fig. 2 is a transverse section through the same;

Fig. 3 is an elevational view of a portion of the tread;

Fig. 4 is an enlarged section of a small portion of one of the non-skid elements;

Fig. 5 is an enlarged, more or less diagrammatic, view showing the relation to the U-shaped wires and textile strands in relation to each other; and Fig. 6 is an elevational detail of a portion of a textile-wire used in the manufacture of the non-skid elements.

Referring to the accompanying drawing and particularly to Figs. 1 and 2 thereof, it is evident that a tire constructed in accordance with the present invention may have a conventional carcass 1 provided with the usual soft rubber tread cushion 2 over which the breaker strip 3 is secured, the latter being covered by a tread 4 that may be provided with suitable depressions 5 of any desired design to afford a more or less irregularly corrugated tread surface to enhance the anti-slipping qualities of the tire. Embedded in the central portion of the tread 4 are non-skid elements 19.

The base material for the manufacture of non-skid elements of the character exemplified herein may comprise woven fabric having for example its weft formed of parallel steel wires, or of fine steel wires twisted into weft strands, or relatively fine wires in parallel relation, or any equivalent arrangement, while the warp preferably comprises twisted textile fibers that are free from wire so that each metallic strand is separated from similar adjoining strands. Fig. 6, for example, shows fabric of this character in which the wire weft strands, that may comprise a single wire of comparatively high carbon content, are designated by the numeral 10, the warp strands of strong cotton yarn or the like being designated by numeral 12.

Fabric of this character preferably is severed into elongate strips with the wire elements running transversely thereof; the fabric being rubberized before or after the strips are cut so that in either case the woven strips are covered with a layer of unvulcanized rubber. The fabric strips are bent back upon themselves in a central longitudinal fold designated by dot and dash line A—A, Fig. 6, so that each wire 10 has both ends 14 disposed at one edge of the folded strip. Thus, the folded rubberized strip has one side at which each wire is provided with a U-shape bend 15 that is free from sharp corners or projections while the opposite side is provided with a rubberized surface with numerous exposed wire ends. The U-shaped rubberized strip thus formed is then bent back and forth upon itself or wound into a spiral in order to provide one of the non-skid elements that is to be embedded in the tire tread.

The tread has a plurality of recesses or openings 20 to receive the non-skid elements 19 thus formed; these openings may extend directly through the tread rubber so that the non-skid elements rest upon the cementitious layer that covers the breaker strip 3. The tire carcass, tread and non-skid elements, are assembled in a mold where vulcanizing pressure and temperature are applied. Thus, the rubberized fabric of the non-skid elements is vulcanized so that the U-shaped strips form a substantial unitary whole and are integral with the tread rubber itself, the pressure of vulcanization serving to press the wire ends 14 outwardly so that they are substantially flush with the surface of the tire tread.

It is evident that tires manufactured in accordance with this invention are provided with non-skid elements having inner surfaces that may be supported by the tire carcass and which are free from sharp projections or corners, i. e., which may be continuously rubberized so that there is no tendency to undue wear or cutting of the adjoining portion of the tire. The outer surfaces of these members due to the compression of the rubber under tractive conditions are adapted to provide an unusually tenacious grip of the wheel upon the pavement through the action of the myriad wire ends which project substantially at right angles through any lubricating film to engage the numerous irregularities in the road surface itself and indeed to make fine irregularities, if the same are lacking.

Due to the large number of wire ends which may project only a slight distance beyond the compressed rubber surface, there is little tendency for the wires to be bent out of their perpendicular position. Firm engagement of the textile strands with the same, the strands being embedded in the vulcanized rubber, serves to oppose any movement of this character and to hold the wires firmly in place, although permitting the tread to deform when passing over road irregularities. The arrangement of the wires extending only in a generally perpendicular direction and being retained out of engagement from each other by the textile strands prevents excessive internal heating of the traction elements and avoids the consequent injury to the rubber and the consequent deterioration of the same. Furthermore the rubber and fabric surrounding and supporting the individual wires has a yieldability comparable to that of the surrounding tread rubber, permitting relative movement between the metal elements without necessitating flexing of the individual comparatively stiff wires and consequent undue rise in the temperature of the same. As the tire wears, the ends 14 of the wire elements also wear so that the wire portions continue to remain substantially flush with the tread surface. The textile strands which extend parallel to its surface continue to be effective in holding the remaining portions of the wire elements in position as the tire wears; consequently the wires remain perpendicular in relation to the traction surface and continue to be effective substantially during the life of the tire.

In this connection it will be noted as indicated in Fig. 6 that the fabric strip forming the non-skid elements is ordinarily bent in such a manner that two textile strands are at the bottom of the U-shaped fold, each one of these strands engaging and supporting the lower portions of alternate U-shaped wires, thus a particularly firm supporting effect is provided for the wire elements.

It is evident that non-skid elements of the character disclosed herein may be manufactured at low cost by the utilization of suitable fabric looms, strip cutters, folding rolls and rubberizing apparatus and that the same may be readily inserted in the unvulcanized rubber of the tread and integrally joined thereto, so that a tire of this type need cost but little more to manufacture than tires of ordinary construction.

I claim:

1. A non-skid tire having a tread with spaced anti-slip elements therein, each of said elements comprising parallel substantially U-shaped folds of fabric, said fabric including textile strands extending substantially parallel to the tread surface, and substantially U-shaped wires interwoven therewith, the ends of said wires being exposed at the tread surface.

2. A non-skid tire having a tread with spaced anti-slip elements therein, each of said elements comprising parallel substantially U-shaped folds of fabric, said fabric including textile strands extending substantially parallel to the tread surface, and substantially U-shaped wires interwoven therewith, the ends of said wires being exposed at the tread surface and being perpendicular to the same, said fabric being impregnated with rubber and vulcanized to the rubber of the tread body.

3. A non-skid tire having a tread with spaced anti-slip elements therein, each of said elements comprising parallel substantially U-shaped folds of fabric, said fabric including textile strands extending substantially parallel to the tread surface, and substantially U-shaped wires interwoven therewith, the ends of said wires being exposed at the tread surface, said fabric being impregnated with rubber and vulcanized to the rubber of the tread body, the wires being substantially in parallelism with each other and perpendicular to the tread surface, whereby crossing of the wires and consequent excessive heating during flexing of the tread is avoided.

4. A non-skid tire having a tread with spaced anti-slip elements therein, each of said elements comprising parallel substantially U-shaped folds of fabric, said fabric including textile strands extending substantially parallel to the tread surface, and substantially U-shaped wires interwoven therewith, the ends of said wires being exposed at the tread surface, said fabric being impregnated with rubber and vulcanized to the rubber of the tread body, a plurality of the fabric strands engaging opposite sides of the wires from the region of the exposed ends to the bight portions of the same, whereby the wires are firmly held against displacement.

Signed by me at Boston, Massachusetts, this 18th day of December, 1928.

ROLAND B. RESPESS.